(12) United States Patent
Suyama et al.

(10) Patent No.: US 9,922,613 B2
(45) Date of Patent: Mar. 20, 2018

(54) IMAGE DISPLAY DEVICE

(71) Applicant: Sharp Kabushiki Kaisha, Sakai, Osaka (JP)

(72) Inventors: Tatsuhiko Suyama, Sakai (JP); Norio Ohmura, Sakai (JP); Noriyuki Tanaka, Sakai (JP); Makoto Yokoyama, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/323,990

(22) PCT Filed: Jul. 3, 2015

(86) PCT No.: PCT/JP2015/069262
§ 371 (c)(1),
(2) Date: Jan. 5, 2017

(87) PCT Pub. No.: WO2016/006544
PCT Pub. Date: Jan. 14, 2016

(65) Prior Publication Data
US 2017/0162158 A1  Jun. 8, 2017

(30) Foreign Application Priority Data

Jul. 11, 2014  (JP) ................................. 2014-143528

(51) Int. Cl.
*G09G 5/10* (2006.01)
*G09G 3/36* (2006.01)
*G06F 1/32* (2006.01)

(52) U.S. Cl.
CPC ......... *G09G 3/3677* (2013.01); *G06F 1/3265* (2013.01); *G09G 3/3688* (2013.01); *G09G 2310/08* (2013.01); *G09G 2330/00* (2013.01); *G09G 2360/12* (2013.01)

(58) Field of Classification Search
CPC ............... G09G 3/3677; G09G 3/3688; G09G 2360/12; G09G 2330/00; G09G 2310/08; G06F 1/3265
See application file for complete search history.

(56) References Cited

U.S. PATENT DOCUMENTS

2005/0206637 A1   9/2005 Takahashi et al.
2015/0049103 A1*  2/2015 Kumeta .................. G09G 3/20
                                                                345/534

FOREIGN PATENT DOCUMENTS

JP         2005-266178 A     9/2005

* cited by examiner

*Primary Examiner* — Adam R Giesy
(74) *Attorney, Agent, or Firm* — Keating & Bennett, LLP

(57) ABSTRACT

In a liquid crystal display device, it is determined whether or not image data inputted from the outside has changed from image data of the previous frame by comparing those image data with respect to each line. As a result, when it is determined that the image data has changed, an entire screen is not rewritten, but image data from a top of a screen as a fixed position to a last line with the image data having changed are read from a frame memory and written into a pixel formation portion. Accordingly, of the screen for one frame, a screen from a top thereof to the last line where the image change has been detected is updated, and on subsequent lines, an image of the previous frame is continuously displayed.

9 Claims, 10 Drawing Sheets

FIG. 4
(A)
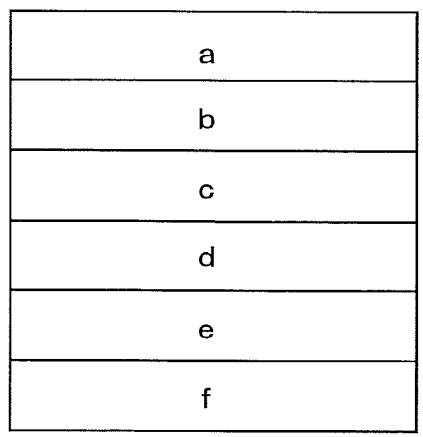
(B)
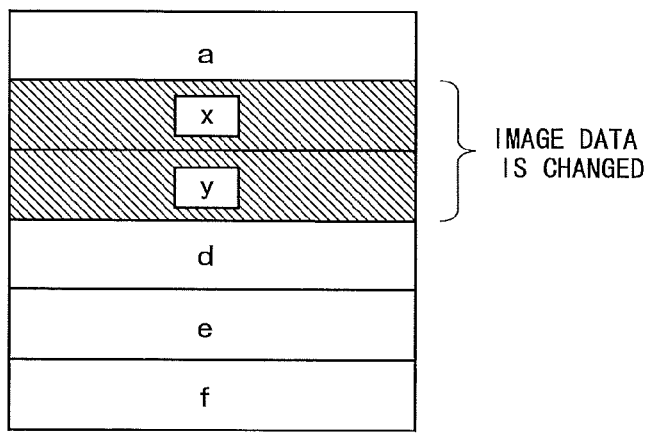
(C)
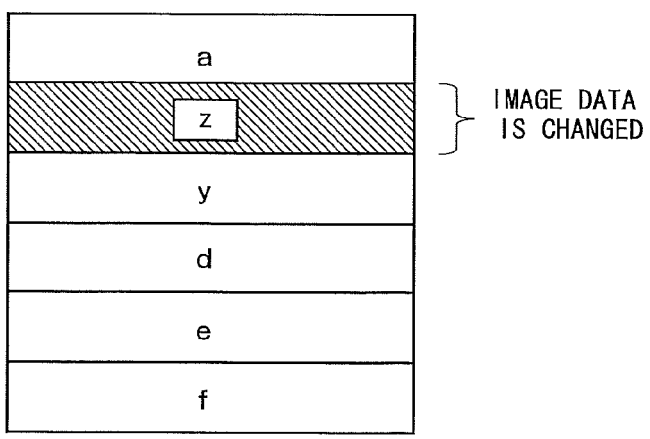

IMAGE DISPLAY DEVICE

TECHNICAL FIELD

The present invention relates to an image display device, and particularly, relates to an image display device capable of displaying an image in a partial display mode in pause driving, and a driving method for the image display device.

BACKGROUND ART

In recent ears, small-sized lightweight electronic devices have been actively developed. A liquid crystal display device to be mounted on such an electronic device has been required to consume less power. One of driving methods for reducing power consumption in the liquid crystal display device is a driving method called "pause driving" in which, in a driving period for sequentially selecting scanning signal lines and writing a voltage for driving (hereinafter referred to as a "source signal") obtained based on image data, a pause period for making all the scanning signal lines inactive and pausing writing is provided. In the pause driving, a signal for control, for example, is prevented from being provided to the scanning signal line drive circuit and the data signal line drive circuit, thereby pausing operation of the scanning signal line drive circuit and the data signal line drive circuit in the pause period. This allows reduction in power consumption.

However, a liquid crystal display device capable of performing the pause driving has a circuit configuration to rewrite the entire screen, even when the portion of the screen is to be rewritten, and thus a portion unnecessary to rewrite is also rewritten. Patent Document 1 describes a liquid crystal display device in which image data is provided to a display region of a display screen to display characters and images, and constant voltage data (white data) is provided to a non-display region to display an image on the portion of the screen in a time division manner.

PRIOR ART DOCUMENT

Patent Document

[Patent Document 1] Japanese Patent Application Laid-Open No. 2005-266178

SUMMARY OF THE INVENTION

Problems to be Solved by the Invention

However, in the method, described in Patent Document 1, for displaying characters and images on the portion of the display screen in a time-division manner, since constant voltage data is written into the non-display region, scanning signal lines in the non-display region need to be driven, in addition to scanning signal lines in the display region. For this reason, even when characters and images are to be displayed on the portion of the screen in a time-division manner, the power consumption cannot be reduced.

Accordingly, it is an object of the present invention to provide an image display device in which reduction in power consumption is feasible in the case of rewriting the portion of a screen in pause driving.

Means for Solving the Problems

A first aspect of the present invention is directed to an image display device capable of displaying an image in a partial display mode in pause driving, the device including:

a display unit including a plurality of scanning signal lines formed on an insulating substrate, a plurality of data signal lines respectively intersecting with the plurality of scanning signal lines, and a plurality of pixel formation portions arranged in a matrix form, respectively corresponding to intersections of the scanning signal lines and the data signal lines;

a scanning signal line drive circuit configured to sequentially activate and select the scanning signal lines;

a data signal line drive circuit configured to apply a source signal in accordance with image data to each of the data signal lines;

a frame memory configured to hold a video signal inputted from the outside while dividing the image data contained in the video signal into a plurality of partial image data, and sequentially output the divided partial image data;

an image comparison circuit configured to compare the partial image data outputted from the frame memory with corresponding partial image data of held image data of the previous frame, and output an address of the changed partial image data as change information to the timing control circuit when determining that the partial image data has been changed; and a timing control circuit configured to provide an address of image data from the partial image data of a fixed position to the partial image data specified by the change information, as a read instruction, to the frame memory upon receipt of the change information, and also provide the address of the image data provided to the frame memory, to the scanning signal line drive circuit as a gate operation instruction, wherein the frame memory outputs the image data with the address specified by the read instruction to the data signal line drive circuit, the data signal line drive circuit applies, to the data signal line, the source signal of the partial image data outputted from the frame memory, and the scanning signal line drive circuit sequentially activate and select the scanning signal lines so as to write, into the pixel formation portion, the source signal applied to the data signal line.

A second aspect of the present invention provides the display device according to the first aspect of the present invention, wherein the image comparison circuit includes a memory capable of holding image data for one frame, and every time the partial image data is provided from the frame memory, the image comparison circuit compares the partial image data with corresponding partial image data of the previous frame held in the memory.

A third aspect of the present invention provides the display device according to the first aspect of the present invention, wherein the image comparison circuit includes a checksum arithmetic circuit, and a memory configured to hold a checksum value obtained by the checksum arithmetic circuit, and every time the partial image data is provided from the frame memory, the checksum arithmetic circuit compares a checksum value of the partial image data with a checksum value of corresponding partial image data of the previous frame held in the memory.

A fourth aspect of the present invention provides the display device according to the second aspect of the present invention, wherein the frame memory sequentially outputs, to the image comparison circuit, the image data obtained by division with respect to each line as the partial image data.

A fifth aspect of the present invention provides the display device according to the second aspect of the present invention, wherein the frame memory sequentially outputs, to the image comparison circuit, the image data obtained by division with respect to each block made up of a plurality of lines, as the partial image data.

A sixth aspect of the present invention provides the display device according to the first aspect of the present invention, wherein the fixed position is a first line of the image data.

A seventh aspect of the present invention provides the display device according to the first aspect of the present invention, the device further including a scan direction determination circuit configured to decide a scan direction at the time of rewriting image data, wherein upon receipt of the change information from the image comparison circuit, the scan direction determination circuit outputs the scan direction which makes a range of rewriting required images small, as scan information, to the timing control circuit and the scanning signal line drive circuit, the timing control circuit provides the scan information to the frame memory along with the read instruction, the frame memory reads image data with an address specified by the read instruction in a sequence specified by the scan information, and provides the read data to the data signal line drive circuit, and the scanning signal line drive circuit sequentially activates and selects the scanning signal line specified by the gate operation instruction, in the scan direction specified by the scan information, so as to display an image based on the image data with the address specified by the read instruction.

An eighth aspect of the present invention provides the display device according to the first aspect of the present invention, wherein the fixed position includes a first fixed position that is a position of a first line of the image data and a second fixed position that is a last line of the image data, and the scan direction determination circuit compares the number of lines at the time of scanning from the first fixed position to a line immediately before a first line where the image has changed with the number of lines at the time of scanning from a line subsequent to a last line where the image has changed to the second fixed position, and takes a direction of a smaller number of lines as the scan direction.

A ninth aspect of the present invention is directed to a method for an image display device, the device including:
a display unit including a plurality of scanning signal lines formed on an insulating substrate, a plurality of data signal lines respectively intersecting with the plurality of scanning signal lines, and a plurality of pixel formation portions arranged in a matrix form, respectively corresponding to intersections of the scanning signal lines and the data signal lines;
a scanning signal line drive circuit configured to sequentially activate and select the scanning signal lines; and
a data signal line drive circuit configured to apply a source signal in accordance with image data to each of the data signal lines,
the method being to perform pause driving in which refresh of a screen is paused,
the method including the steps of:
holding a video signal inputted from the outside while dividing the image data contained in the video signal into a plurality of partial image data, and sequentially outputting the divided partial image data from a frame memory;
comparing the partial image data outputted from the frame memory with corresponding partial image data of held image data of the previous frame, and upon determination that the partial image data has been changed, outputting an address of the changed partial image data as change information to the timing control circuit;
providing an address of image data from the partial image data of a fixed position to the partial image data specified by the change information, as a read instruction, to the frame memory upon receipt of the change information, and also providing the address of the image data provided to the frame memory, to the scanning signal line drive circuit as a gate operation instruction;
outputting, by the frame memory, the image data with the address specified by the read instruction, to the data signal line drive circuit,
applying to the data signal line the source signal of the partial image data outputted from the frame memory; and
sequentially activating and selecting the scanning signal lines so as to write, into the pixel formation portion, the source signal applied to the data signal line.

Effects of the Invention

According to the above first aspect, in the image display device, when an image changes by part of image data changing from image data of the previous frame in pause driving, the entire screen is not rewritten, but image data from partial image data of a fixed position to partial image data determined to have been changed are read from a frame memory, to be written into the pixel formation portion. Thus, of the screen for one frame, a screen from the fixed position to the last line where the image change has been detected is updated, and on each of subsequent lines, the image of the previous frame is continuously displayed. This allows reduction in power consumption of the image display device.

According to the above second aspect, each partial image data provided from the frame memory is compared with the corresponding partial image data of the previous frame which is held in the memory, to determine whether or not the image data has changed. Hence it is possible to reliably detect changed partial image data.

According to the above third aspect, a checksum value is obtained with respect to each partial image data provided from the frame memory, and the obtained value is compared with a checksum value of the corresponding partial image data of the previous frame which is held in the memory. In this case, the checksum value may simply be held with respect to each partial image data, and hence a memory with a small capacity is sufficiently used. This can reduce the circuit scale of the image comparison circuit, thereby reducing manufacturing cost of the image display device.

According to the above fourth aspect, since the partial image data is image data obtained by division with respect to each line, rewriting can be performed only on the line where an image has changed. This allows reduction in power consumption of the image display device.

According to the above fifth aspect, since the partial image data is image data obtained by division with respect to each block made up of a plurality of lines, the capacity of the memory for holding the image data after being subjected to comparison can be made small. Further, since the operation of the scanning signal line drive circuit is controlled with respect to each block, the circuit scale can be reduced. It is thereby possible to reduce manufacturing cost of the image display device.

According to the above sixth aspect, with the first line of the image data taken as the fixed position, when the image has changed, rewriting is performed on lines from the first line to the last line where the image change is completed in one frame.

According to the above seventh aspect, the scan direction determination circuit determines the position of the line where the image has changed and decides the gate scan direction so as to make the rewriting range small, and hence the amount of image data to be rewritten can be made even smaller. This allows reduction in power consumption of the image display device.

According to the above eighth aspect, the scan direction determination circuit compares the number of lines at the time of scanning from the first fixed position to the line immediately before the first line where the image has changed with the number of lines at the time of scanning from the line subsequent to the last line where the image has changed to the second fixed position, and takes a direction of the smaller number of lines as the scan direction. This can facilitate decision of the direction in which scanning is to be performed.

According to the above ninth aspect, a similar effect to the case of the first aspect is exerted.

BRIEF DESCRIPTION OF THE DRAWINGS

FIGS. 4(A) to 4(C) are views showing screens displayed in the liquid crystal display device shown in FIG. 1 in respective frame periods from a first frame period to a third frame period, and more specifically, FIG. 4(A) is a view showing a screen displayed in the first frame period, FIG. 4(B) is a view showing a screen displayed in the second frame period, and FIG. 4(C) is a view showing a screen displayed in the third frame period.

MODES FOR CARRYING OUT THE INVENTION

1. First Embodiment

<1.1 Configuration of Image Display Device>

Figure 1:
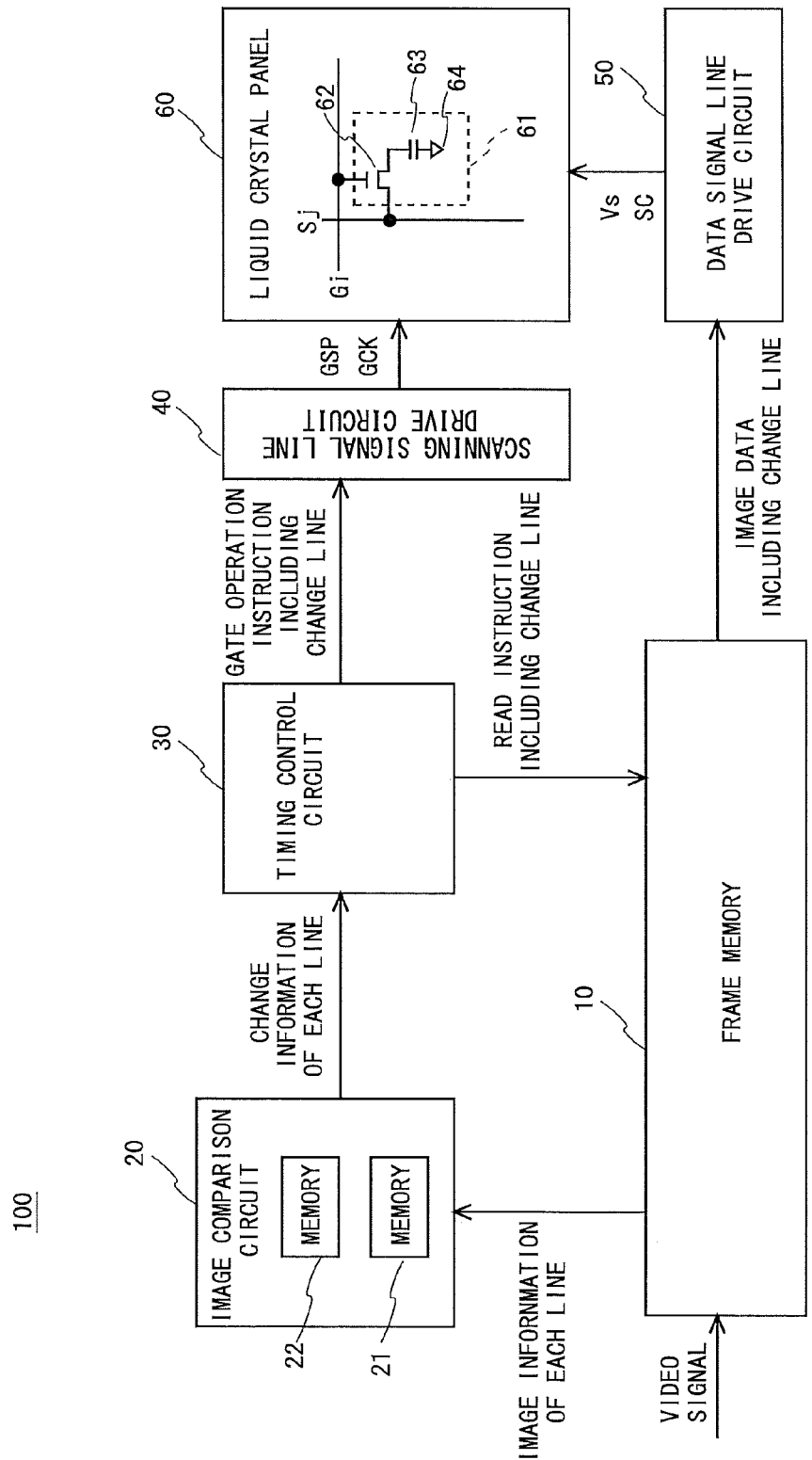
FIG. 1 is a block diagram showing a configuration of a liquid crystal display device according to a first embodiment of the present invention.

FIG. 1 is a block diagram showing a configuration of a liquid crystal display device (this may be referred to as an "image display device") 100 according to a first embodiment of the present invention. As shown in FIG. 1, a liquid crystal display device 100 includes a scanning signal line drive circuit 40, a data signal line drive circuit 50, a liquid crystal panel 60, a frame memory 10, an image comparison circuit 20, and a timing control circuit 30.

In the liquid crystal panel 60 (this may be referred to as a "display unit"), there are formed a plurality of (m) data signal lines S1 to Sm, and a plurality of (n) scanning signal lines G1 to Gn, and a plurality of (m×n) pixel formation portions 61 provided corresponding to respective intersections of the m data signal lines S1 to Sm and the n scanning signal lines G1 to Gn. In this manner, the (m×n) pixel forming units 61 are two-dimensionally arranged, with m units in a row direction and n units in a column direction. A scanning signal line Gi is connected in common to the pixel formation portions 61 arranged on an ith row, and a data signal line Sj is connected in common to the pixel formation portions 61 arranged on a jth column. Note that m and n are integers of 2 or more.

The scanning signal line drive circuit 40 outputs high-level clock signals GCK sequentially one by one to the scanning signal lines G1 to Gn. Hence the scanning signal lines G1 to Gn provided with the high-level clock signals GCK are activated and selected sequentially one by one. The pixel formation portions 61 for one row which are connected to the selected scanning signal line Gi come into a state where source signals Vs in accordance with image data can be written in a batch. The data signal line drive circuit 50 is controlled by a control signal SC, and applies the source signal Vs in accordance with image data to each of the data signal lines S1 to Sm. Accordingly, the source signal Vs is written into each of the pixel formation portions 61 for one row which is connected to the selected scanning signal line Gi.

Each pixel formation portion 61 has a gate terminal as a control terminal connected to the scanning signal line Gi that passes through the corresponding intersection. Each pixel formation portion 61 is made up of: a thin film transistor (this may be referred to as a "TFT") 62 having a source terminal as a first conduction terminal connected to the data signal line Sj passing through the intersection; a pixel electrode 63 connected to a drain terminal of the TFT 62 as a second conduction terminal; a common electrode 64 provided in common to the m×n pixel formation portions 61; and a liquid crystal layer (not shown) sandwiched between the pixel electrode 63 and the common electrode 64, and provided in common to the plurality of pixel formation portions 61. Among them, the pixel electrode 63, the common electrode 64, and the liquid crystal layer constitute a pixel capacitance.

As the TFT 62, for example, a TFT using an oxide semiconductor for a channel layer is used. More specifically, the channel layer of TFT 62 is formed of indium gallium zinc oxide containing indium (In), gallium (Ga), zinc (Zn), and an oxide (O). The TFT 62 using indium gallium zinc oxide for the channel layer has a very small off-leak current as compared with a silicon TFT using polycrystal silicon, amorphous silicon, or the like for the channel layer. As a result, the source signal Vs written into a pixel capacitance is held for a long period, and hence the TFT 62 is suitable for a switching element of the pixel formation portion 61 of the liquid crystal display device 100 for performing pause driving. Note that a similar effect can also be obtained even in the case of using, for the channel layer, an oxide semiconductor containing at least one of indium, gallium, zinc, copper (Cu), silicon (Si), tin (Sn), aluminum (Al), calcium (Ca), germanium (Ge), and lead (Pb), as an oxide semiconductor other than indium gallium zinc oxide. Further, a silicon TFT of polycrystal silicon, amorphous silicon, or the like may be used as the TFT 62.

A function and operation of each of the frame memory 10, the image comparison circuit 20, and the timing control circuit 30 which are included in the liquid crystal display device 100 are described later.

<1.2 Partial Display Mode>

Figure 2:
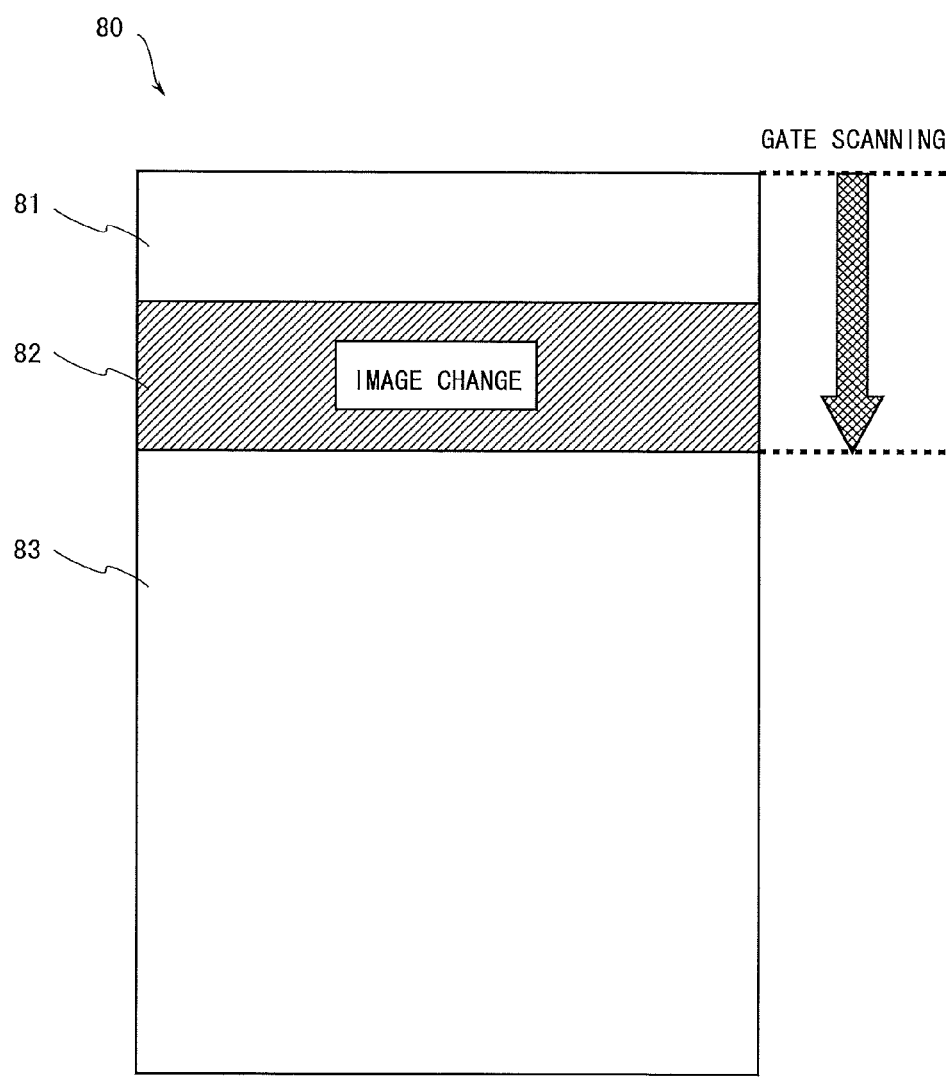
FIG. 2 is a view for illustrating a partial display mode in the liquid crystal display device shown in FIG. 1.

FIG. 2 is a view for illustrating a partial display mode in the present embodiment. As shown in FIG. 2, when a region 82 made up of lines where an image has changed from the previous frame is in the portion of a screen 80, the entire screen 80 is not updated, but only the portion of the screen 80 is updated.

First, image data inputted from the outside is compared with the corresponding image data of the previous frame with respect to each line, to detect a line where an image has changed. Hence the region 82 made up of the lines where the image has changed is specified. As shown in FIG. 2, the region 82 as thus specified is located in a position a little apart downward from the top of the screen, and vertically sandwiched between a region 81 and a region 83 each made up of lines where an image has not changed.

Next, as an arrow shown in FIG. 2, for updating the portion of the screen 80, gate scanning is performed to sequentially activate and select scanning signal lines from a line at the top of the region 81 to a line at the bottom of the region 82 where the image has changed, to rewrite the image data. The screen is thereby updated on each line in the region 81 and the region 82. The same image as that of the previous frame is displayed in the region 81, and an updated image is displayed in the region 82. However, the image data is not rewritten on the lines in the region 83. Hence in the region 83, the screen is not updated, and the same image as that of the previous frame is continuously displayed.

<1.3 Operation of Liquid Crystal Display Device>

Figure 3:
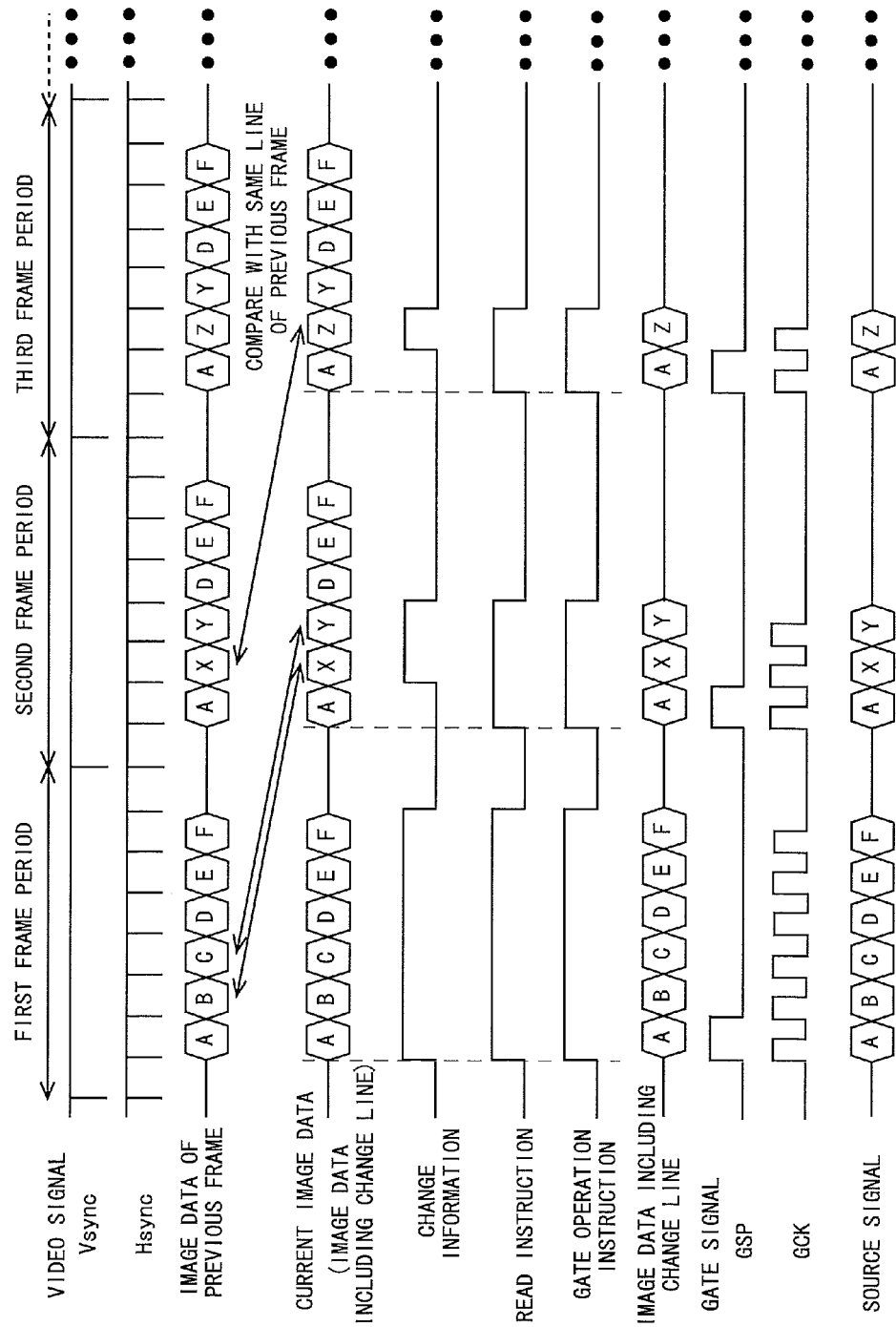
FIG. 3 is a timing chart showing operation of the liquid crystal display device shown in FIG. 1.

FIG. 3 is a timing chart showing the operation of the liquid crystal display device 100. The case of operating the liquid crystal display device 100 in the partial display mode shown in FIG. 2 is described with reference to FIGS. 1 and 3. The frame memory 10 is a memory capable of holding a video signal just for one frame. When video signals containing image data, a vertical synchronizing signal Vsync, and a horizontal synchronizing signal Hsync are inputted from the outside into the frame memory 10, the frame memory 10 sequentially holds each of the video signals therein, and simultaneously outputs the video signal as image information to the image comparison circuit 20 with respect to each line. Note that the image data of each line may be referred to as "partial image data".

The image comparison circuit 20 is provided with a memory 22 capable of holding a video signal for one frame, and a memory 21 for temporarily holding the video signal for one line provided from the frame memory 10. The image comparison circuit 20 holds, in the memory 21, image data contained in the video signal provided from the frame memory 10, and compares the image data with image data of the corresponding line of the previous frame which is held in the memory 22. When the image data provided from the frame memory 10 has changed from the image data held in the memory 22 as a result of the comparison, change information indicating that the image data of the line has changed is outputted each time to the timing control circuit 30. This change information shows a line where the image has changed by an active (high-level) signal. After performing the image comparison, the image comparison circuit 20 overwrites the image data temporarily held in the memory 21 over the corresponding line in the memory 22. Hence the image comparison circuit 20 can also detect whether or not each of image data in a new frame, provided from the outside one after another, has changed from the image data of the previous frame.

When receiving the change information, the timing control circuit 30 provides the frame memory 10 with image data including image data of the line where the image has changed. A read instruction is an instruction for reading not only image data of a line where an image has changed, but also image data of a line which is before the above line and where an image has not changed, and the read instruction is an instruction for specifying addresses of the lines so as to read these image data. The position of the line to start reading the image data is fixed. For example, in the partial display mode shown in FIG. 2, the read instruction includes not only an address of the line in the region 82 with the image data having changed, but also an address of the line in the region 81. Hence the read instruction is an active signal successively from the first line in the region 81 as the fixed position to the last line in the region 82 where the image has changed.

Upon receipt of the read instruction from the timing control circuit 30, the frame memory 10 reads a video signal containing image data of the lines specified by the read instruction out of the held image data, and outputs the video signal to the data signal line drive circuit 50. For example in the partial display mode shown in FIG. 2, the image data are sequentially read from the first line in the region 81 to the last line in the region 82, and outputs the read data to the data signal line drive circuit 50.

The timing control circuit 30 further provides a gate operation instruction to the scanning signal line drive circuit 40. Similarly to the read instruction, the gate operation instruction is an instruction for making the scanning signal line drive circuit 40 perform operation on not only a line with image data having changed, but also a line which is before the above line and where an image has not changed, and the gate operation instruction is an instruction for specifying an address of a scanning signal line to be activated and selected. For example, in the partial display mode shown in FIG. 2, the gate operation instruction includes not only an address for specifying a scanning signal line to be selected for writing image data of the line in the region 82, but also all addresses each specifying a scanning signal line to be selected for writing image data of the line in the region 81. Hence, similarly to the read instruction, the gate operation instruction is an active signal successively from the first line in the region 81 to the last line in the region 82 where the image has changed.

The data signal line drive circuit 50 takes the vertical synchronizing signal Vsync and the horizontal synchronizing signal Hsync out of the video signals received from the frame memory 10. The data signal line drive circuit 50 generates the source signal Vs from image data while generating the control signal SC such as a start pulse and a clock signal, and applies those signals to each data signal line. Based on the gate operation instruction and the video signal received from the timing control circuit 30, the scanning signal line drive circuit 40 generates a start signal GSP and a clock signal GCK, and sequentially applies the generated signals to the scanning signal line. Note that the start signal GSP is a signal outputted at the position of the first line (fixed position) in a frame where image data is to be rewritten, and the clock signal GCK is a signal outputted every time the scanning signal line is activated.

When the change is detected by comparing the image data with respect to each line in the above manner, image data of the first line to the last line where the image has changed are read from the frame memory 10, and the source signal Vs corresponding to the read image data is applied to the data signal line. Further, by sequentially activating and selecting the scanning signal lines, each of the source signals Vs applied into the data signal lines is written in a batch into each pixel formation portion 61 connected to the same scanning signal line. Accordingly, the screen from the top thereof to the last line where the image has changed is updated. Of the updated screen, a new image is displayed on the line where the image has changed, and the same image as that of the previous frame is displayed on the line where the image has not changed. Further, on the line where the screen has not updated, the image displayed in the previous frame is continuously displayed.

Next, a more specific description is given of the operation of the liquid crystal display device 100 in each frame period of the first frame period to the third frame period. In the following description, image data in each frame period is made up of data A to F of six lines for convenience of description.

In a first frame period, as compared with the previous frame period (not shown), all of the data A of the first line to the data F of the sixth line have been changed. In this case, when detecting that the data A of the first line has changed, the image comparison circuit 20 provides the timing control circuit 30 with active change information indicating that an image on the first line has changed. When detecting that the data B of the second line has changed, the image comparison circuit 20 provides the timing control circuit 30 with active change information indicating that an image on the second line has changed. The same applies to the subsequent lines, and when detecting that the data F of the sixth line has changed, the image the image comparison circuit 20 provides the timing control circuit 30 with active change information indicating that an image of the sixth line has changed. Upon each receipt of the change information, the timing control circuit 30 generates a read instruction indicating an address of the image data of the line specified by the change information, and outputs the generated instruction to the frame memory 10. Accordingly, image data including a change line in the first frame period is generated. Further, when the line specified by the change information is the first line, for writing the data A of the first line into the pixel formation portion 61, a gate operation instruction indicating an address of a scanning signal line corresponding to the first line is generated and outputted to the scanning signal line drive circuit 40. When the line specified by the change information is the second line, for writing the data B of the second line into the pixel formation portion 61, a gate operation instruction indicating an address of a scanning signal line corresponding to the second line is generated and outputted to the scanning signal line drive circuit 40. The same applies to the subsequent lines, and for writing the data f of the sixth line into the pixel formation portion 61, a gate operation instruction indicating an address of a scanning signal line corresponding to the sixth line is generated and outputted to the scanning signal line drive circuit 40.

The data signal line drive circuit 50 applies, to the data signal line Sj, the source signals Vs obtained based on the respective data sequentially from the data A of the first line to the data F of the sixth line. The scanning signal line drive circuit 40 sequentially activates and selects the respective scanning signal lines from the scanning signal line G1 corresponding to the first line to the scanning signal line G6 corresponding to the sixth line, based on the gate operation instruction provided from the timing control circuit 30, and the start signal GSP, and the clock signal GCK. Hence the data A is written into the pixel formation portion 61 connected to the first scanning signal line G1 of the liquid crystal panel 60, and the data B is written into the pixel formation portion 61 connected to the second scanning signal line G2. The same applies to the subsequent lines, and the data F is written into the pixel formation portion 61 connected to the sixth scanning signal line G6. In this manner, the image each displayed from the first to sixth lines of the screen is updated, to display a new image changed from the image of the previous frame.

In the second frame period, as compared with the first frame period, the data B of the second line has been changed to data X, and the data C of the third line has been changed to data Y, whereas the data on the other lines remain unchanged. In this case, the image comparison circuit 20 detects that the data has changed in each of the second and third lines, and provides the timing control circuit 30 with change information with respect to each line, the change information indicating that the image has changed in each of the second and third lines. Upon receipt of the change information indicating that the change has been made on each of the second and third lines, the timing control circuit 30 provides the frame memory 10 with a read instruction with respect to each line to read video signals containing the image data of the first to third lines. Accordingly, image data including a change line in the second frame period is generated. Further, the timing control circuit 30 provides the scanning signal line drive circuit 40 with a gate operation instruction with respect to each line to activate the respective scanning signal lines corresponding to the first to third lines. As thus described, the read instruction and the gate operation instruction are generated not only in each of the second and third lines where the image change has detected, but also in all lines (the first line in this case) prior thereto. The read instruction is provided to the frame memory 10, and the gate operation instruction is provided to the scanning signal line drive circuit 40.

The data signal line drive circuit 50 sequentially generates the source signal Vs from each data from the data A of the first line to the data Y of the third line, and applies the source signal Vs to the data signal line. The scanning signal line drive circuit 40 sequentially activates and selects the respective scanning signal lines from a scanning signal line G1 corresponding to the first line to the scanning signal line G3 corresponding to the third line, based on the gate operation instruction provided from the timing control circuit 30, and the start signal GSP, and the clock signal GCK. Hence the data A is written into the pixel formation portion 61 connected to the first scanning signal line G1 of the liquid crystal panel 60, the data B is written into the pixel formation portion 61 connected to the second scanning signal line G2, and the data C is written into the pixel formation portion 61 connected to the third scanning signal line G3. In this manner, the images displayed on the first to third lines of the screen are updated. The same image as that of the previous frame is displayed on the first line, a new image x after the change is displayed on the second line, and a new image y after the change is displayed on the third line. However, images on the fourth to sixth lines of the screen are not updated, and the images displayed in the first frame period are continuously displayed.

In the third frame period, as compared with the second frame period, the data X of the second line has been changed to data Z, whereas the data on the other lines remain unchanged. In this case, the image comparison circuit 20 detects that the data has changed in the second line, and provides the timing control circuit 30 with change information indicating that the image has changed on the second line. Upon receipt of the change information indicating that the second line is active, the timing control circuit 30 provides the frame memory 10 with a read instruction for reading a video signal containing the image data of the first line and the second line. Hence image data including a change line in the third frame period is generated. Further, the timing control circuit 30 provides the scanning signal line drive circuit 40 with a gate operation instruction to activate the scanning signal line G1 corresponding to the first line and the scanning signal line G2 corresponding to the second line. As thus described, the read instruction and the gate operation instruction are generated not only on the second line where the image change has detected, but also in all lines therebefore (the first line in this case). The read instruction is provided to the frame memory 10, and the gate operation instruction is provided to the scanning signal line drive circuit 40.

The data signal line drive circuit 50 generates the source signal Vs from each data from the data A of the first line to the data Z of the second line, and applies the source signal Vs to the data signal line. The scanning signal line drive circuit 40 sequentially selects the respective scanning signal lines of the scanning signal line G1 corresponding and the first line to a scanning signal line G2 corresponding to the second line, based on the gate operation instruction provided from the timing control circuit 30, and the start signal GSP, and the clock signal GCK. Hence the data A is written into the pixel formation portion 61 connected to the first scanning signal line G1 of the liquid crystal panel 60, and the data Z is written into the pixel formation portion 61 connected to the second scanning signal line G2. In this manner, the images displayed on the first line and the second line of the screen are updated. The same image as that of the previous frame is displayed on the first line, and a changed, new image is displayed on the second line. However, the images on the third to sixth lines of the screen are not updated, and the images displayed in the first frame period are continuously displayed.

FIGS. 4A to 4C are views showing screens displayed in the respective frame periods from the first frame period to the third frame period. More specifically, FIG. 4(A) is a view showing a screen displayed in the first frame period, FIG. 4(B) is a view showing a screen displayed in the second frame period, and FIG. 4(C) is a view showing a screen displayed in the third frame period.

In the first frame period shown in FIG. 4(A), all of the data A of the first line to the data F of the sixth line have been changed from data of the previous frame (not shown). Then on the screen, an image a corresponding to the data A is displayed on the first line, an image b corresponding to the data B is displayed on the second line, and an image c corresponding to the data C is displayed on the third line. The same applies to the subsequent lines, and an image f corresponding to the data F is displayed on the sixth line.

In the second frame period shown in FIG. 4(B), the data B of the second line has been changed to the data X, and the data C of the third line has been changed to the data Y. Then, an image x a corresponding to the data X is displayed on the second line, and an image y corresponding to the data Y is displayed on the third line. However, the data A of the first line and the data D to F of the fourth to sixth lines have not been changed from the data of the corresponding lines in the first frame period. For this reason, on the screen, the image a is displayed on the first line, and the images d to f are displayed on the fourth to sixth lines.

In the third frame period shown in FIG. 4(C), the data X of the second line has been changed to data Z. An image z corresponding to the data Z is then displayed on the second line. However, the data A of the first line and the data Y to F of the third to sixth lines have not been changed from the data in the second frame period. Hence on the screen, the image a is displayed on the first line, and the images x to f are displayed on the third to sixth lines.

<1.4 Effect>

According to the present embodiment, when an image changes by part of image data changing from that of the previous frame in the pause driving, the entire screen is not rewritten, but image data are rewritten from the first line (fixed position) where the gate scanning is to be started to the last line with the change in image data having been detected, and for the subsequent lines, the image data is not rewritten. Thus, at the time of displaying a screen for one frame, the screen is updated from the top thereof to the last line where the image change has been detected, and on each of the subsequent lines, the image of the previous frame is continuously displayed. This allows reduction in power consumption of the liquid crystal display device 100.

2. Second Embodiment

Figure 5:
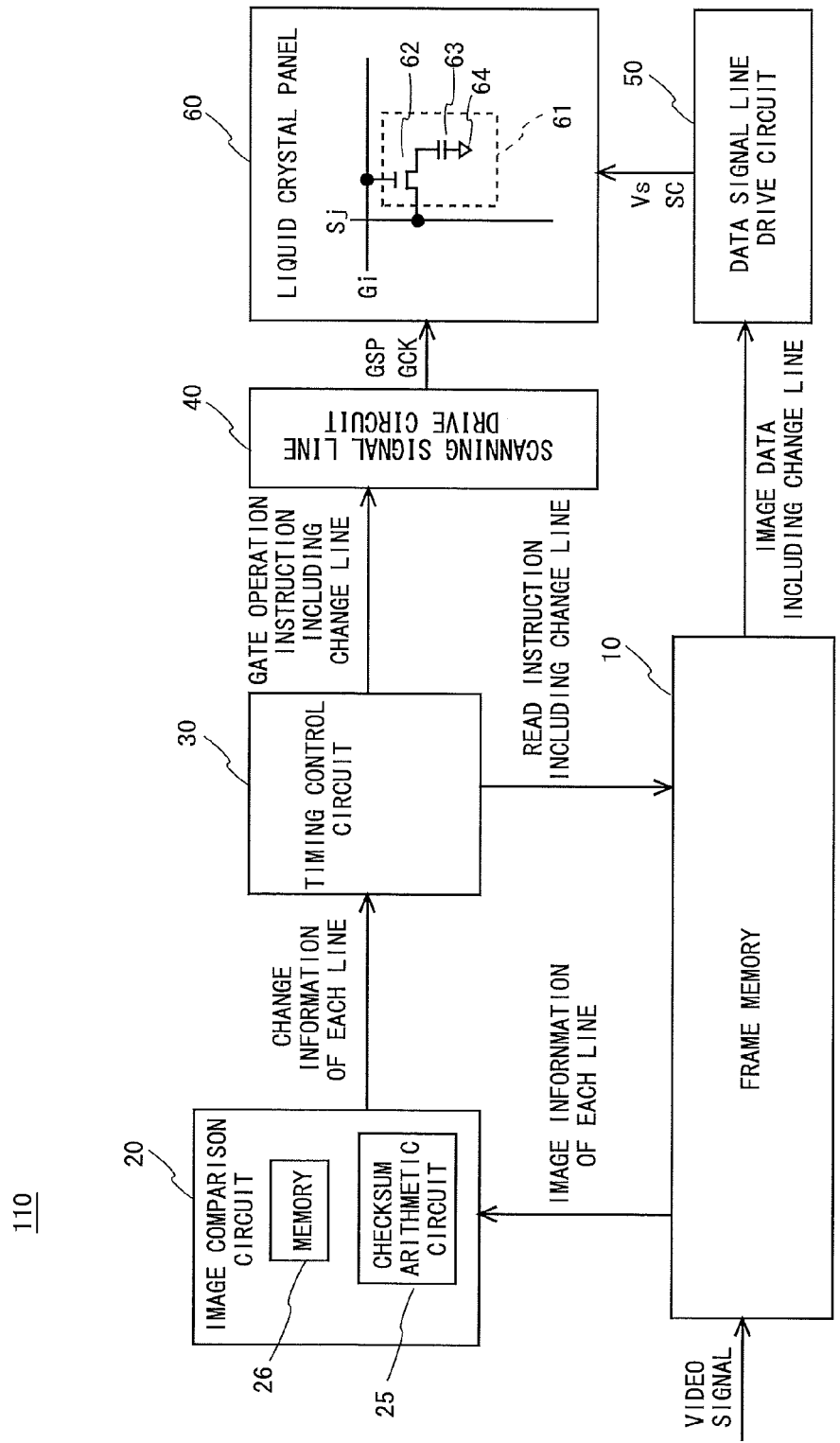
FIG. 5 is a diagram showing a configuration of a liquid crystal display device according to a second embodiment of the present invention.

FIG. 5 is a diagram showing a configuration of a liquid crystal display device 110 according to a second embodiment of the present invention. The liquid crystal display device 110 according to the present embodiment is different from the liquid crystal display device 100 shown in FIG. 1 in that in place of the memory 21 and the memory 22 disposed in the image comparison circuit 20, a checksum arithmetic circuit 25 and a memory 26 are disposed, the checksum arithmetic circuit 25 calculating a checksum value of image data, the memory 26 holding a checksum value just for one frame calculated by the checksum arithmetic circuit 25. However, the other components are the same as the components of the liquid crystal display device 100 shown in FIG. 1. Therefore, of the components of the liquid crystal display device 110, the same components as components of the liquid crystal display device 100 are provided with the same reference numerals, and descriptions thereof are omitted.

A description is given of operation of the liquid crystal display device 110 when operated in the partial display mode, the operation being different from the case of the first embodiment. When video signals containing image data, a vertical synchronizing signal Vsync, and a horizontal synchronizing signal Hsync are inputted from the outside into the frame memory 10, the frame memory 10 sequentially holds each of the video signals therein, and simultaneously outputs the video signal as image information to the image comparison circuit 20 with respect to each line.

The image comparison circuit 20 obtains a checksum value of image data, included in image information of each line provided from the frame memory 10, by the checksum arithmetic circuit 25 and compares the obtained value with a checksum value of a corresponding line of the previous frame which is held in the memory 26. When the checksum value of the image data received from the frame memory 10 has changed from the checksum value held in the memory 26 as a result of the comparison, change information indicating that the image data of the line has changed is outputted to the timing control circuit 30. This change information shows a line where the image has changed by an active (high-level) signal. After performing the image comparison, the image comparison circuit 20 overwrites the checksum value obtained by the checksum arithmetic circuit 25 over the corresponding line in the memory 26. Hence the image comparison circuit 20 can also detect whether or not each of image data in a new frame, provided from the outside one after another, has changed from the image data of the previous frame. Note that processing to be performed after the image comparison circuit 20 detects whether or not the image data of each line has changed based on the checksum value is the same as in the case of the first embodiment, and a description of the processing is thus omitted.

<2.1 Effect>

According to the present embodiment, the liquid crystal display device 110 exerts the same effect as that of the liquid crystal display device 100 according to the first embodiment. Further, the checksum arithmetic circuit 25 and the memory 26 for holding a checksum value obtained by the checksum arithmetic circuit 25 are provided in the image comparison circuit 20. This memory 26 may simply hold a checksum value of each line concerning image data for one frame instead of holding image data for one frame like the memory 22 provided in the image comparison circuit 20 of the first embodiment, and hence a memory with a small capacity may be used. This can reduce the circuit scale of the image comparison circuit 20, thereby reducing manufacturing cost of the liquid crystal display device 110.

3. Third Embodiment

Figure 6:
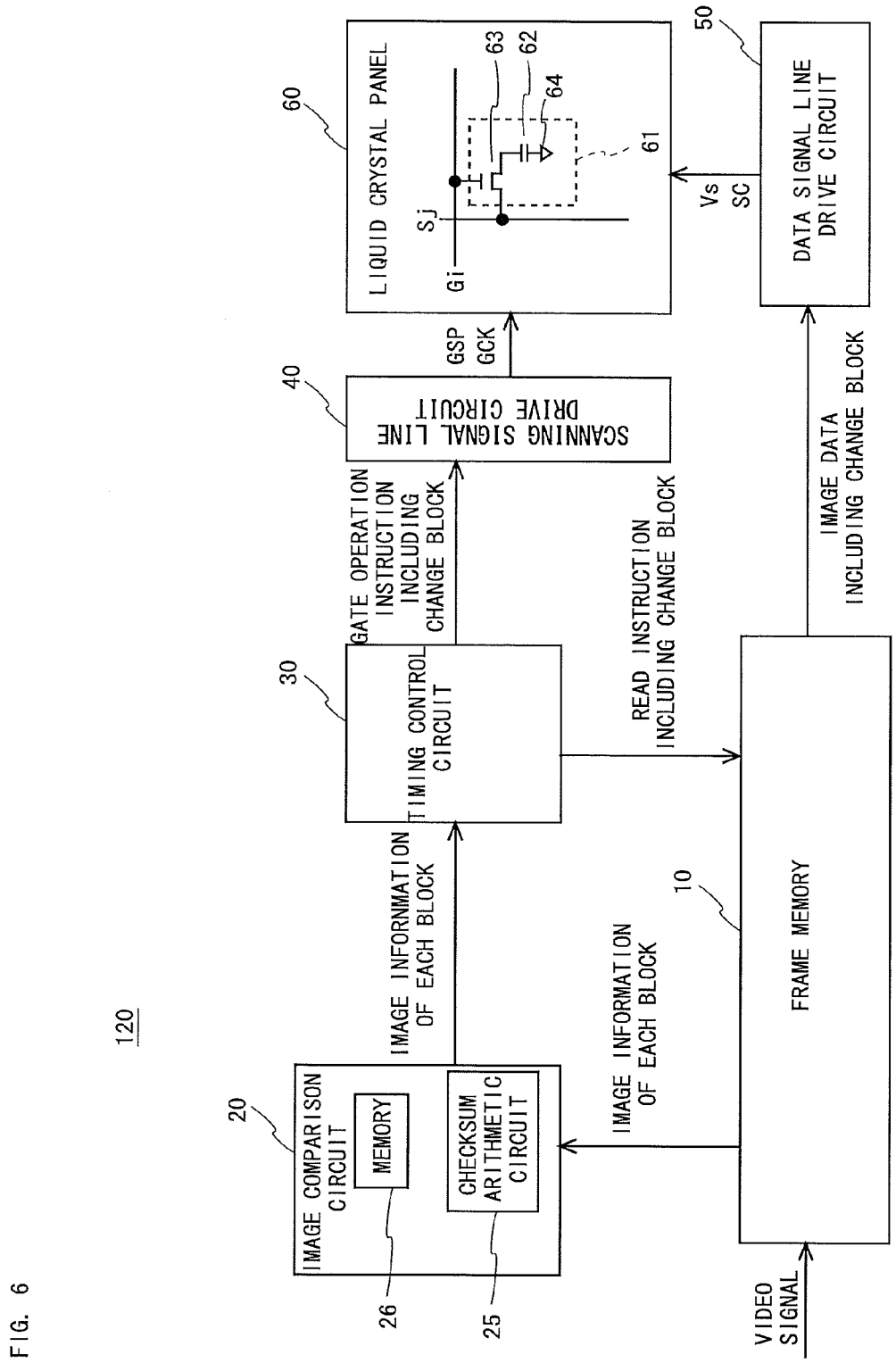
FIG. 6 is a diagram showing a configuration of a liquid crystal display device according to a third embodiment of the present invention.

FIG. 6 is a diagram showing a configuration of a liquid crystal display device 120 according to a third embodiment of the present invention. The liquid crystal display device 120 according to the present embodiment is different from the liquid crystal display device 110 shown in FIG. 5 in the following respect. Specifically, for detecting whether or not image data has changed, in the liquid crystal display device 110 shown in FIG. 5, image data of each line is outputted from the frame memory 10 to the image comparison circuit 20, and a checksum value is obtained with respect to each line by the checksum arithmetic circuit 25 of the image comparison circuit 20. However, in the present embodiment, the frame memory 10 outputs, to the image comparison circuit 20, image data of each k lines (k is an integer of 2 or more and n or less), namely, each block, and the image comparison circuit 20 obtains a checksum value with respect to each block by the checksum arithmetic circuit 25. Similarly to the image data of each line, image data of each block may be referred to as "partial image data."

For this reason, in the liquid crystal display device 120, change information outputted from the image comparison circuit 20 to the timing control circuit 30, a read instruction outputted from the timing control circuit 30 to the frame memory 10, and a gate operation instruction outputted from the timing control circuit 30 to the scanning signal line drive circuit 40 are either information or an instruction which is outputted with respect to each block.

As thus described, in the liquid crystal display device 120, the configuration of the image comparison circuit 20 is different as compared with the case of the liquid crystal display device 110 shown in FIG. 5, but the other components are the same as the components of the liquid crystal display device 110. Therefore, of the components of the liquid crystal display device 120, the same components as the components of the liquid crystal display device 110 are provided with the same reference numerals, and descriptions thereof are omitted.

<3.1 Partial Display Mode>

Figure 7:
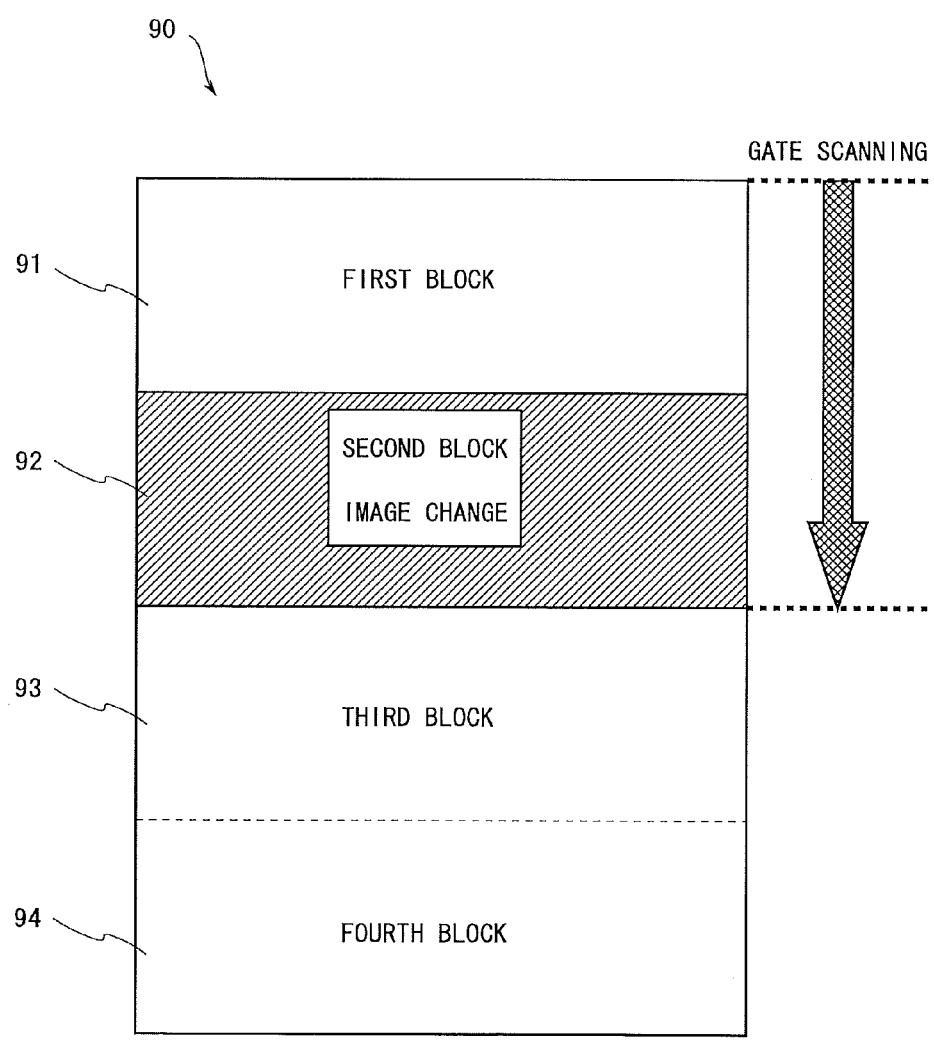
FIG. 7 is a view for illustrating a partial display mode in the present embodiment in the liquid crystal display device shown in FIG. 6.

FIG. 7 is a view for illustrating a partial display mode in the present embodiment. Image data is provided to the liquid crystal display device 120 in the state of being previously divided into blocks such that each block has k (k is an integer of 2 or more and n or less) lines. In FIG. 7, the image data is divided into a first block 91 to a fourth block 94. In one block of the four blocks constituting a screen 90, when an image has changed from the corresponding block of the previous frame, the entire screen 90 is not updated, but the screen in the block where the image has changed and all blocks located before that block is updated.

First, image data inputted from the outside with respect to each block is compared with image data of the corresponding block of the previous frame, to detect a block where an image has changed. Thereby, the second block 92 where an image has changed is specified. The second block 92 as thus specified is located in a position a little apart downward from the top of the screen 90 as shown in FIG. 7, and vertically sandwiched between the first block 91 and the third block 93 where images have not changed.

Next, as an arrow shown in FIG. 7, for updating the portion of the screen 90, the gate scanning is performed to sequentially activate and select scanning signal lines from a first line in the first block 91 as the fixed position to a last line in the second block 92 where the image has changed, to rewrite the image data. The screen is thereby updated on each line in the first block 91 and the second block 92. The same image as that of the previous frame is displayed on each line in the first block 91, and an updated image is displayed on each line in the second block 92. However, in the third block 93 and the fourth block 94, image data is not written. Hence in each of the third block 93 and the fourth block 94, the screen is not updated, and the same image as that of the previous frame is continuously displayed.

<3.2 Effect>

According to the present embodiment, similarly to the case of the second embodiment, the checksum arithmetic circuit 25 provided in the image comparison circuit 20 detects whether or not an image has changed. Further in the present embodiment, since a checksum value is obtained with respect to each block, a capacity of the memory 26 for holding the obtained checksum value can be made small. Moreover, since the operation of the scanning signal line drive circuit 40 is controlled not with respect to each line but with respect to each block, the circuit scale of the scanning signal line drive circuit 40 can be reduced. It is thereby possible to reduce manufacturing cost of the liquid crystal display device 120.

<3.3 Modified Example>

In the present embodiment, the image comparison circuit 20 determines whether or not two images are the same by use of a checksum value. However, similarly to the case of the first embodiment, two memories may be disposed in the image comparison circuit 20, and image data are directly compared with respect to each line, to determine whether or not those data are the same.

<3.4 Application>

Figure 8:
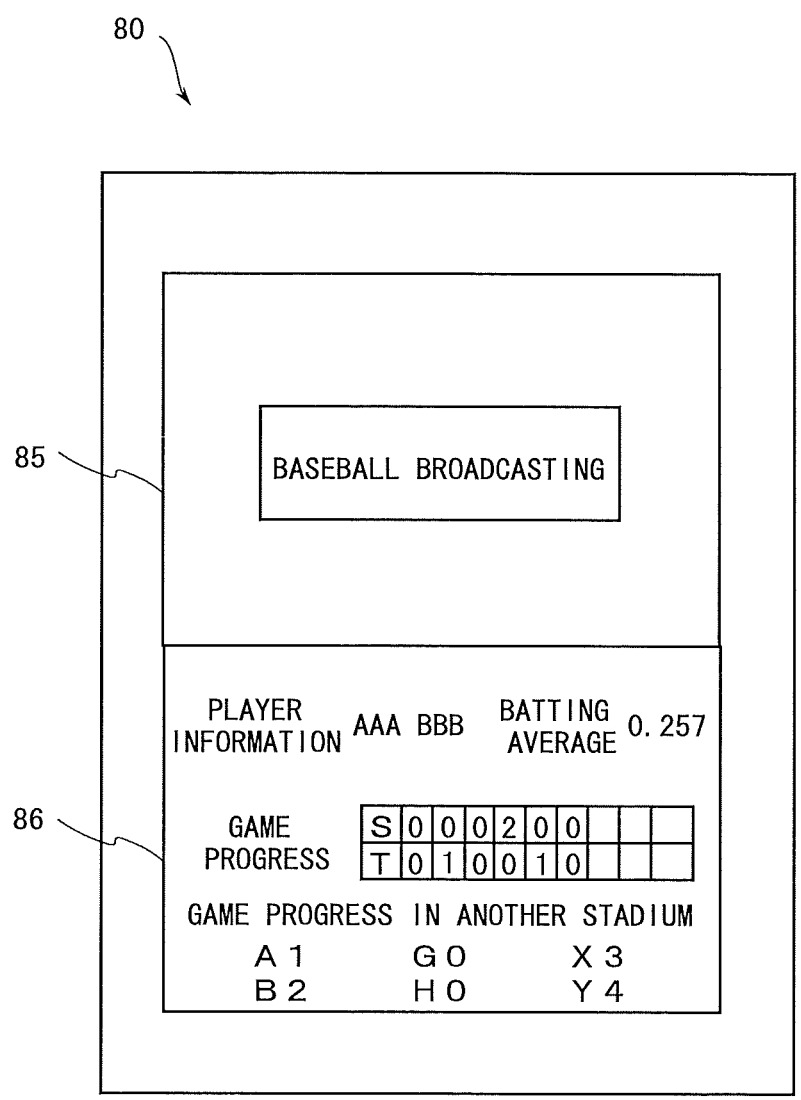
FIG. 8 is a view showing an application of the liquid crystal display device shown in FIG. 6.

FIG. 8 is a view showing an application of the liquid crystal display device 120. As shown in FIG. 8, one screen 80 is divided into two blocks to display a moving image in a block 85, and a still image in a block 86. As shown in FIG. 8, a smart phone and a tablet terminal are often configured such that a moving image of a sport or the like is displayed in the block 85, and a still image of player information, in-progress game reports, and the like are displayed in the block 86. A resolution and an aspect ratio format of a moving image which are required for displaying a moving image on the smart phone and the like have come to be fixed. Thus, whether or not an image has changed is detected with respect to each block, and image data of only a block where the image has changed is rewritten. This allows reduction in power consumption of the smart phone and the like.

Further, in TV broadcasting, an image change is small in a region used for data broadcasting. Thus, on a screen including a block where an image changes a little, whether or not image data has changed is determined with respect to each block, thereby allowing reduction in power consumption.

4. Fourth Embodiment

Figure 9:
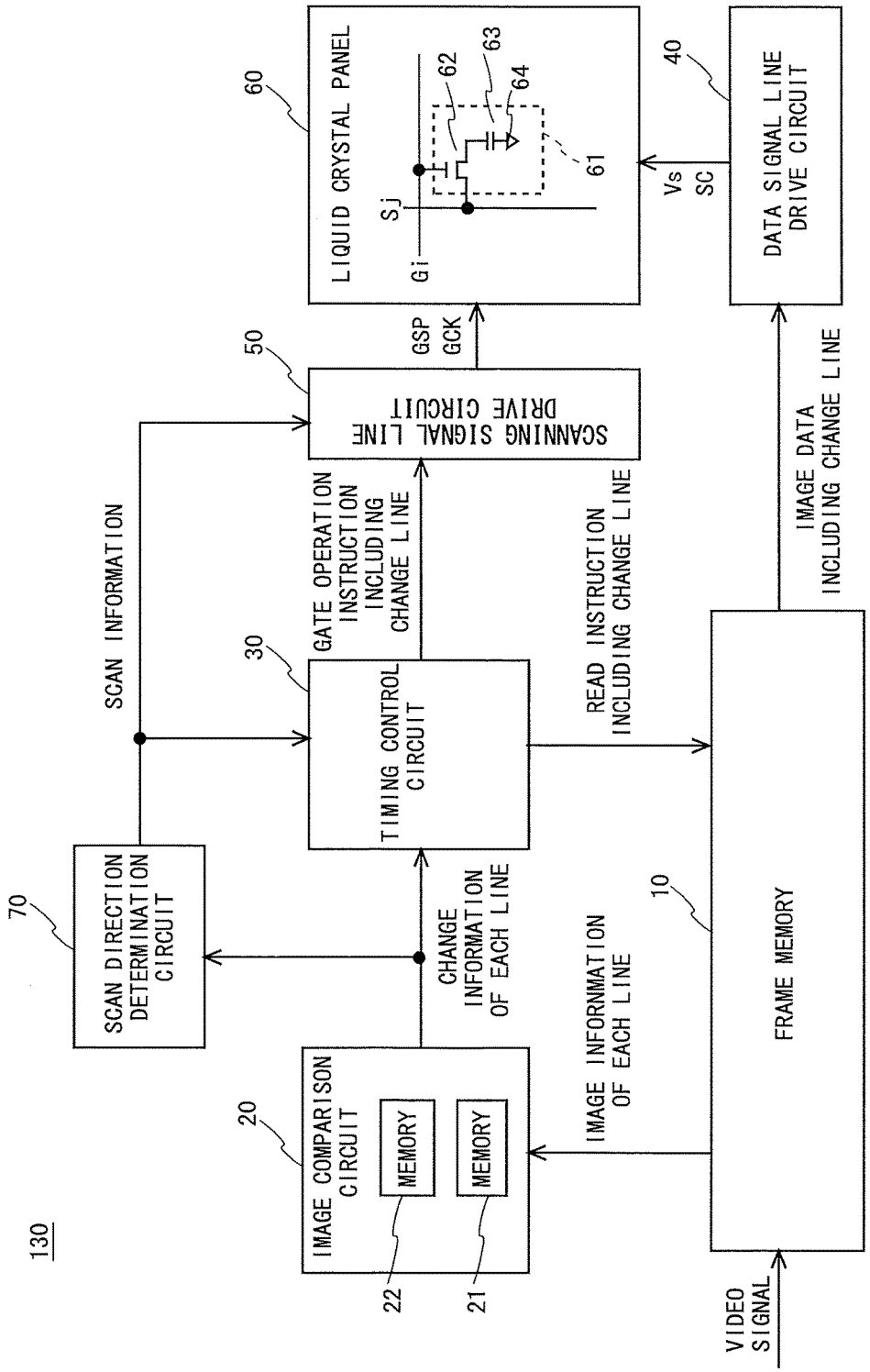
FIG. 9 is a diagram showing a configuration of a liquid crystal display device according to a fourth embodiment of the present invention.

FIG. 9 is a diagram showing a configuration of a liquid crystal display device 130 according to a fourth embodiment of the present invention. In the liquid crystal display device 130 according to the present embodiment, a scan direction determination circuit 70 is added to the liquid crystal display device 100 shown in FIG. 1. Of a configuration and operation of the liquid crystal display device 130, a configuration and operation relevant to the scan direction determination circuit 70 are mainly described, and the same components as the components of the liquid crystal display device 100 shown in FIG. 1 are provided with the same reference numerals, and descriptions thereof are omitted.

The image comparison circuit 20 compares the image data of each line provided from the frame memory 10 with image data for the same line of the previous frame which is held in the memory 22, to determine whether or not the image data has changed. As a result, when determining that the image has changed, the image comparison circuit 20 outputs, to the timing control circuit 30, change information showing how many lines from the top to the line with respect to each line, and also outputs the same information to the scan direction determination circuit 70. The scan direction determination circuit 70 specifies a position of the line where the image has changed, and decides a gate scan direction so as to make an amount of image data small, the image data being rewritten at the time of performing the gate scanning to activate scanning signal lines and sequentially selecting those. That is, it is decided whether the gate scanning is performed from the top toward the bottom of the screen (hereinafter referred to as an "up-direction), or the gate scanning is performed from the bottom toward the top of the screen (hereinafter referred to as a "down-direction"). Then, the decided gate scan direction is provided as scan information to the timing control circuit 30 and the scanning signal line drive circuit 40.

The timing control circuit 30 generates a read instruction for reading the image data of the line where the image has changed based on the change information provided from the image comparison circuit 20 and the scan information provided from the scan direction determination circuit 70, and provides the generated instruction to the frame memory 10. The read instruction is an instruction for specifying not only an address of a line where an image has changed, but also an address of a line which is before or after the above line and where an image has not changed. That is, the read instruction is a signal for specifying an address of each line from a first line of the screen which is a fixed position (this may also be referred to as a "first fixed position") to a last line where an image has changed, or an address of each line from the last line of the screen which is a fixed position (this may also be referred to as a "second fixed position") to the first line where an image has changed. Accordingly, the frame memory 10 sequentially reads a video signal containing image data of the first line of the screen to the last line where the image has changed, or a video signal containing image data from the last line of the screen to the first line where the image has changed. The frame memory 10 then provides the read signals to the data signal line drive circuit 50.

Further, the timing control circuit 30 generates a gate operation instruction based on the change information of each line provided from the image comparison circuit 20 and the scan information provided from the scan direction determination circuit 70, and provides the generated instruction to the scanning signal line drive circuit 40. Similarly to the read instruction, the gate operation instruction is an instruction for specifying an address of a scanning signal line corresponding to a line where an image has changed, and an address of a scanning signal line corresponding to a line which is before or after the above line and where an image has not changed. That is, the gate operation instruction is a signal for specifying an address of a scanning signal line to be selected for writing, into the pixel formation portion 61, image data of each line from the first line of the screen to the last line where the image has changed, or an address of a scanning signal line to be selected for writing, into the pixel formation portion 61, image data of each line from the last line of the screen to the first line where the image has changed.

The scanning signal line drive circuit 40 selects a scanning signal line to be subjected to the gate scanning out of the scanning signal lines based on the gate operation instruction provided from the timing control circuit 30 and the scan information provided from the scan direction determination circuit 70. The scanning signal line drive circuit 40 then performs the gate scanning in a specified scan direction. Accordingly, the image data of the first line of the screen to the last line where the image has changed, or the image data of the last line of the screen to the first line where the image has changed, outputted from the frame memory 10 are sequentially written into the pixel formation portion 61.

<4.1 Partial Display Mode and Gate Scan Direction>

Figure 10:
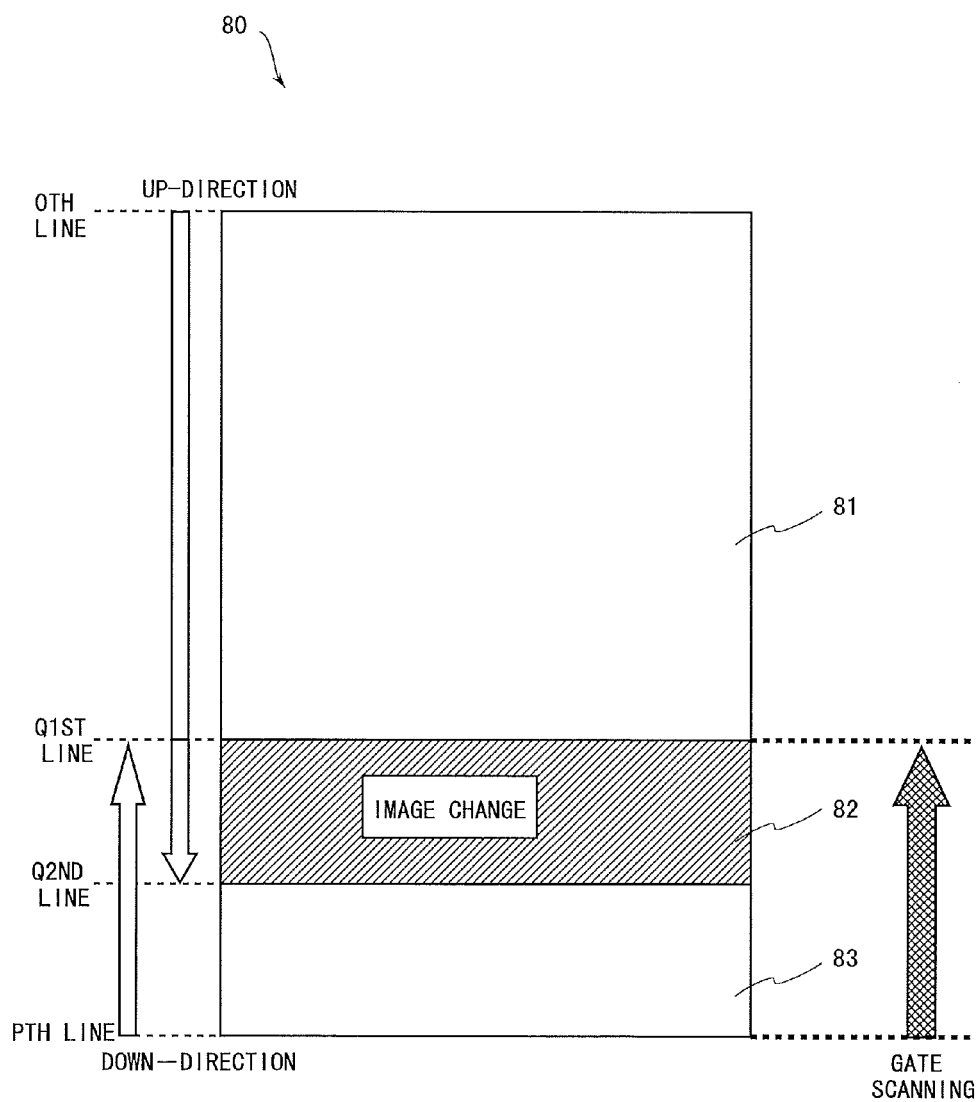
FIG. 10 is a view for describing a partial display mode in the present embodiment in the liquid crystal display device shown in FIG. 9.

A method for determining the gate scan direction is described. FIG. 10 is a view for illustrating a partial display mode in the present embodiment. With reference to FIG. 10, a description is given of a method for determining whether a position of a line with image data having changed is a position closer from the bottom of the screen 80 or a position closer from the top of the screen 80. In the present embodiment, the gate scan direction is decided such that the number of lines with image data required to be rewritten, including a line where an image has changed, is small. Specifically, this decision is made as follows.

The screen 80 shown in FIG. 10 is made up of P lines, and a region 82 made up of lines where an image has changed out of the P lines includes lines from a Q1st line to Q2nd line. In this case, an image has not changed in each of a region 81 from a first line to a (Q1−1)th line and a region 83 from a (P−Q2)th line to a Pth line. At this time, the gate scan direction is decided based on which of the following Expressions (1) to (3) those lines correspond to.

$$(Q1-1) < (P-Q2) \tag{1}$$

$$(Q1-1) > (P-Q2) \tag{2}$$

$$(Q1-1) = (P-Q2) \tag{3}$$

When the lines correspond to Expression (1), the number of lines in the region 81 is smaller than the number of lines in the region 83, and thus the gate scanning is performed in the up-direction. When the lines correspond to Expression (2), the number of lines in the region 83 is smaller than the number of lines in the region 82, and thus the gate scanning is performed in the down-direction. When the lines correspond to Expression (3), since the number of lines in the region 83 is the same as the number of lines in the region 82, the gate scanning may be performed in either the up-direction or the down-direction. For this reason, the gate scanning is performed in a previously decided direction, the up-direction or the down-direction.

<4.2 Effect>

According to the present embodiment, the scan direction determination circuit 70 is provided and determines a position of a line where an image has changed and decides the gate scan direction so as to make a rewriting range small, whereby an amount of image data to be rewritten can be made even smaller. This allows reduction in power consumption of the liquid crystal display device 130.

<4.3 Modified Example>

In the above embodiment, the frame memory 10 provides a video signal provided from the outside as image information with respect to each line, and the image comparison circuit 20 determines whether or not image data has changed. However, similarly to the case shown in FIG. 5, the checksum arithmetic circuit and the memory for holding a checksum value may be provided in the image comparison circuit 20. A checksum value may then be obtained with respect to each line based on image information of each line, and the obtained checksum value may be compared with the checksum value held in the memory.

Further, similarly to the case shown in FIG. 6, image information provided from the frame memory 10 to the image comparison circuit 20 may be provided with respect to each block. The image comparison circuit 20 may then obtain a checksum value with respect to each block based on the image information of each block, and compare the obtained checksum value with the checksum value held in the memory with respect to each block.

INDUSTRIAL APPLICABILITY

The present invention is applied to an image display device, and particularly applied to an image display device capable of performing pause driving.

DESCRIPTION OF REFERENCE CHARACTERS

10: FRAME MEMORY
20: IMAGE COMPARISON CIRCUIT
25: CHECKSUM ARITHMETIC CIRCUIT
30: TIMING CONTROL CIRCUIT
40: SCANNING SIGNAL LINE DRIVE CIRCUIT
50: DATA SIGNAL LINE DRIVE CIRCUIT
60: LIQUID CRYSTAL PANEL
61: PIXEL FORMING UNIT
70: SCAN DIRECTION DETERMINATION CIRCUIT
100 to 130: LIQUID CRYSTAL DISPLAY DEVICE

The invention claimed is:

1. An image display device capable of displaying an image in a partial display mode in pause driving, the device comprising:
    a display unit including a plurality of scanning signal lines formed on an insulating substrate, a plurality of data signal lines respectively intersecting with the plurality of scanning signal lines, and a plurality of pixel formation portions arranged in a matrix form, respectively corresponding to intersections of the scanning signal lines and the data signal lines;
    a scanning signal line drive circuit configured to sequentially activate and select the scanning signal lines;
    a data signal line drive circuit configured to apply a source signal in accordance with image data to each of the data signal lines;
    a frame memory configured to hold a video signal inputted from the outside while dividing the image data contained in the video signal into a plurality of partial image data, and sequentially output the divided partial image data;
    an image comparison circuit configured to compare the partial image data outputted from the frame memory with corresponding partial image data of held image data of the previous frame, and output an address of the changed partial image data as change information to the timing control circuit when determining that the partial image data has been changed; and
    a timing control circuit configured to provide an address of image data from the partial image data of a fixed position to the partial image data specified by the change information, as a read instruction, to the frame memory upon receipt of the change information, and also provide the address of the image data provided to the frame memory, to the scanning signal line drive circuit as a gate operation instruction,
    wherein the frame memory outputs the image data with the address specified by the read instruction to the data signal line drive circuit,
    the data signal line drive circuit applies, to the data signal line, the source signal of the partial image data outputted from the frame memory, and
    the scanning signal line drive circuit sequentially activate and select the scanning signal lines so as to write, into the pixel formation portion, the source signal applied to the data signal line.

2. The image display device according to claim 1, wherein the image comparison circuit includes a memory capable of holding image data for one frame, and every time the partial image data is provided from the frame memory, the image comparison circuit compares the partial image data with corresponding partial image data of the previous frame held in the memory.

3. The image display device according to claim 1, wherein the image comparison circuit includes a checksum arithmetic circuit, and a memory configured to hold a checksum value obtained by the checksum arithmetic circuit, and every time the partial image data is provided from the frame memory, the checksum arithmetic circuit compares a checksum value of the partial image data with a checksum value of corresponding partial image data of the previous frame held in the memory.

4. The image display device according to claim 2, wherein the frame memory sequentially outputs, to the image comparison circuit, the image data obtained by division with respect to each line as the partial image data.

5. The image display device according to claim 2, wherein the frame memory sequentially outputs, to the image comparison circuit, the image data obtained by division with respect to each block made up of a plurality of lines, as the partial image data.

6. The image display device according to claim 1, wherein the fixed position is a first line of the image data.

7. The image display device according to claim 1, further comprising a scan direction determination circuit configured to decide a scan direction at the time of rewriting image data, wherein upon receipt of the change information from the image comparison circuit, the scan direction determination circuit outputs the scan direction which makes a range of rewriting required images small, as scan information, to the timing control circuit and the scanning signal line drive circuit, the timing control circuit provides the scan information to the frame memory along with the read instruction, the frame memory reads image data with an address specified by the read instruction in a sequence specified by the scan information, and provides the read data to the data signal line drive circuit, and the scanning signal line drive circuit sequentially activates and selects the scanning signal line specified by the gate operation instruction, in the scan direction specified by the scan information, so as to display an image based on the image data with the address specified by the read instruction.

8. The image display device according to claim 7, wherein the fixed position includes a first fixed position that is a position of a first line of the image data and a second fixed position that is a last line of the image data, and the scan direction determination circuit compares the number of lines at the time of scanning from the first fixed position to a line immediately before a first line where the image has changed with the number of lines at the time of scanning from a line subsequent to a last line where the image has changed to the second fixed position, and takes a direction of a smaller number of lines as the scan direction.

9. A driving method for an image display device, the device including:

a display unit including a plurality of scanning signal lines formed on an insulating substrate, a plurality of data signal lines respectively intersecting with the plurality of scanning signal lines, and a plurality of pixel formation portions arranged in a matrix form, respectively corresponding to intersections of the scanning signal lines and the data signal lines;

a scanning signal line drive circuit configured to sequentially activate and select the scanning signal lines; and a data signal line drive circuit configured to apply a source signal in accordance with image data to each of the data signal lines, the method being to perform pause driving in which refresh of a screen is paused, the method comprising the steps of:

holding a video signal inputted from the outside while dividing the image data contained in the video signal into a plurality of partial image data, and sequentially outputting the divided partial image data from a frame memory;

comparing the partial image data outputted from the frame memory with corresponding partial image data of held image data of the previous frame, and upon determination that the partial image data has been changed, outputting an address of the changed partial image data as change information to the timing control circuit;

providing an address of image data from the partial image data of a fixed position to the partial image data specified by the change information, as a read instruction, to the frame memory upon receipt of the change information, and also providing the address of the image data provided to the frame memory, to the scanning signal line drive circuit as a gate operation instruction;

outputting, by the frame memory, the image data with the address specified by the read instruction, to the data signal line drive circuit, applying to the data signal line the source signal of the partial image data outputted from the frame memory; and sequentially activating and selecting the scanning signal lines so as to write, into the pixel formation portion, the source signal applied to the data signal line.

* * * * *